Figure 1:
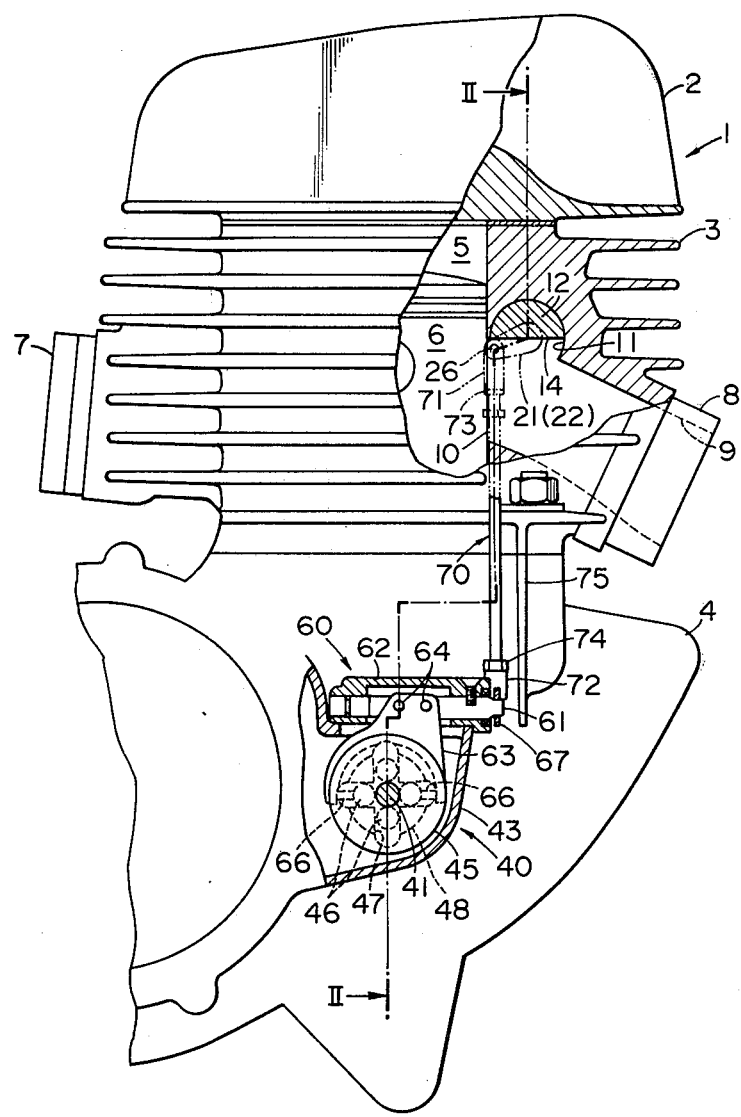

United States Patent [19]

Shibata

[11] 4,325,335

[45] Apr. 20, 1982

[54] TWO STROKE ENGINE HAVING EXHAUST TIMING CONTROL VALVE MEANS

[75] Inventor: Hirotaka Shibata, Hamamatsu, Japan

[73] Assignee: Yamaha, Hatsudoki, Kabushiki, Kaisha, Japan

[21] Appl. No.: 153,707

[22] Filed: May 27, 1980

[30] Foreign Application Priority Data

May 29, 1979 [JP] Japan .................. 54-65592

[51] Int. Cl.³ ............................................. F02D 9/06
[52] U.S. Cl. .................... 123/323; 123/73 R
[58] Field of Search .......... 123/323, 363, 373, 65 PE, 123/65 A, 65 V, 73 SP, 73 R, 65 PD, 65 EM, 73 A

[56] References Cited

U.S. PATENT DOCUMENTS

| | | | |
|---|---|---|---|
| 907,823 | 12/1908 | Larson | 123/363 |
| 2,403,844 | 7/1946 | Bolli | 123/323 X |
| 3,209,853 | 10/1965 | Bunker | 123/363 X |
| 4,121,552 | 10/1978 | Mithuo et al. | 123/65 PE |
| 4,202,297 | 5/1980 | Oku et al. | 123/65 PE |

FOREIGN PATENT DOCUMENTS

| | | | |
|---|---|---|---|
| 388773 | 6/1908 | France | 123/363 |
| 1043618 | 6/1953 | France | 123/323 |
| 47-36047 | 9/1972 | Japan | 123/65 PE |

*Primary Examiner*—Wendell E. Burns
*Attorney, Agent, or Firm*—Kerkam, Stowell, Kondracki & Clarke

[57] ABSTRACT

A two stroke engine having an exhaust port formed in the cylinder wall. At the upper portion of the exhaust port, there is provided a rotary type exhaust timing control valve which is adapted to be actuated by a centrifugal governor device to control the exhaust timing in accordance with the engine speed. The centrifugal governor device has a governor shaft which extends coaxially with the engine crankshaft and directly connected at one end with the adjacent end of the crankshaft.

3 Claims, 2 Drawing Figures

TWO STROKE ENGINE HAVING EXHAUST TIMING CONTROL VALVE MEANS

The present invention relates to two stroke engines and more particularly to two stroke engines having rotary valves for controlling exhaust port timings in accordance with engine speed. More specifically, the present invention pertains to actuating means for such rotary valves.

Conventional two stroke engines generally include an exhaust port provided in the cylinder wall so that it is controlled by the piston as the piston reciprocates in the cylinder. It has been recognized that the exhaust port timing has an important effect on the engine performance and that the optimum exhaust timing is dependent on the engine speed. In order to provide an improved engine performance, the exhaust port timing must be advanced under a high engine speed than that under a low engine speed.

In order to meet the aforementioned requirement, there has already been proposed, by Japanese utility model application Sho No. 49—111838 corresponding to the United States patent application Ser No. 781,429 which is a continuation of Ser. No. 612,863 and matured into U.S. Pat. No. 4,121,552, to provide a rotary valve member at the upper portion of the exhaust port. The valve member has a part-circular cross-sectional configuration and rotatable between a retracted position wherein the valve member is retracted from the exhaust port and a projected position wherein the valve member projects into the exhaust port to thereby cover the upper portion of the exhaust port so that the exhaust port timing is changed. In the United States patent application Ser. No. 916,751 filed on June 12, 1978 and assigned to the assignee of the present invention, there is disclosed a specific valve structure which is suitable for obtaining a reliable operation.

In order to control the rotary valve in accordance with the engine speed, a centrifugal actuating device is proposed by the United States patent application Ser. No. 61,514 filed on July 24, 1979 now U.S. Pat. No. 4,285,311. According to the proposal, the actuating device includes a driven shaft extending perpendicularly to and driven by the engine crankshaft or a countershaft provided in parallel with the crankshaft. At one end of the driven shaft, there is an actuating rod provided for axial movement with respect to the driven shaft. Between the driven shaft and the actuating rod, there is provided a centrifugal mechanism so that the axial position of the actuating rod is determined with respect to the driven shaft in accordance with the rotating speed of the driven shaft. The actuating rod is connected through an actuating lever with the rotary valve whereby the valve is actuated in accordance with the rotating speed of the driven shaft or the engine speed. The proposed mechanism is, however, complicated in structure because the driven shaft has to be supported at the opposite end portions by bearings and a worm gear mechanism or a bevel gear mechanism has to be used between the driven shaft and the engine crankshaft or the countershaft.

It is therefore an object of the present invention to provide simple and reliable means for actuating such rotary type exhaust port timing control valve in accordance with the engine speed.

Another object of the present invention is to provide rotary valve actuating means having a centrifugal device arranged coaxially or parallelly with the engine crankshaft.

A further object of the present invention is to provide rotary valve actuating centrifugal device having a driven shaft supported through a single bearing assembly and driven by the engine crankshaft without using any worm or bevel gear mechanism.

According to the present invention, the above and other objects can be accomplished by a two stroke engine comprising cylinder means, piston means which is received in said cylinder means for reciprocating movement, and crankshaft means connected with said piston means, said cylinder means having exhaust port means adapted to be closed by said piston means, exhaust port timing control rotary valve means provided in said exhaust port means at upper portion thereof, said valve means being movable between a projected position wherein it is projected into the exhaust port means to thereby cover the upper portion of the exhaust port means and a retracted position wherein it is retracted from the exhaust port means, actuator means for moving said valve means between said projected and retracted positions in accordance with engine speed, said actuator means including driven shaft means extending parallelly with said crankshaft means and having one end connected with said crankshaft means to be driven thereby, centrifugal means provided at the other end of the driven shaft means and connected with said valve means so that said valve means is moved toward the projected position in response to a decrease in the engine speed. In one aspect of the present invention, the driven shaft means is coaxial and directly connected with the crankshaft means so that it is only required to support the driven shaft means by bearing means at the other end portion thereof.

The centrifugal means may comprise a disc adapted to be driven by the crankshaft means and having one surface formed with at least one radial groove, a substantially conical member having a substantially conical surface opposed to said one surface of the disc with a freedom of axial movement with respect thereto, spring bias means for urging said conical member toward the disc, at least one centrifugal ball provided between said disc and said conical member and received in said radial groove. The valve means may be connected with a vertically extending push rod to be actuated thereby and means may be provided for transferring the axial movement of the conical member into a vertical movement of the push rod.

Figure 2:
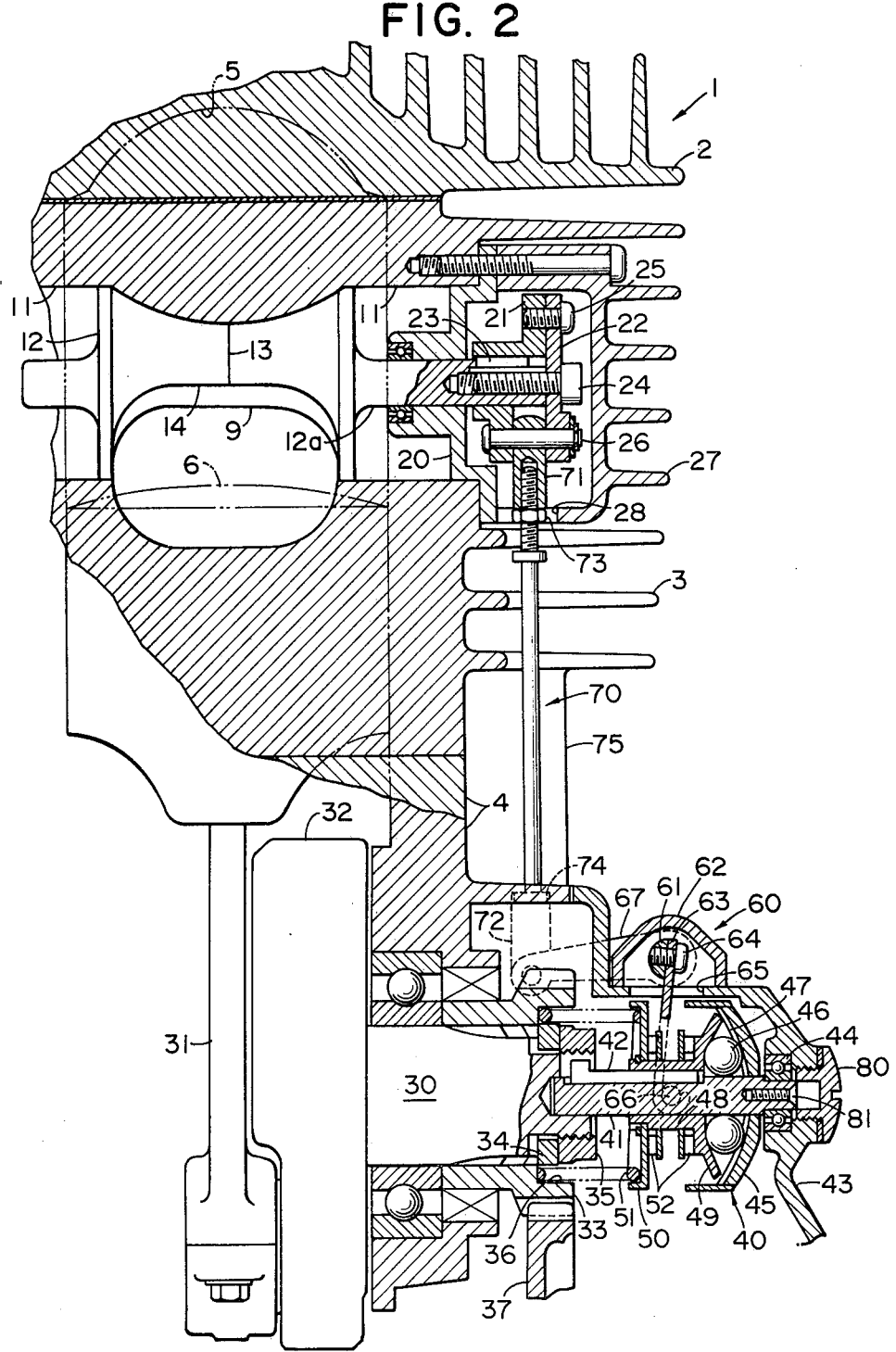

The above and other objects and features of the present invention will become apparent from the following descriptions of a preferred embodiment taking reference to the accompanying drawings, in which;

FIG. 1 is a partially cut-away side view of a two-stroke engine embodying the features of the present invention; and, FIG. 2 is a sectional view taken substantially along the line II—II in FIG. 1.

Referring now to the drawings, there is shown a two stroke engine 1 including a cylinder head 2, a cylinder 3 and a crankcase 4 which are connected together in a conventional manner. In the cylinder 3, there is defined a combustion chamber 5 and a piston 6 is disposed for reciprocating movement. The cylinder 3 is provided with an intake pipe 7 which is in communication with an intake port (not shown) formed in the cylinder 3. At the opposite side of the intake pipe 7, the cylinder 3 is formed with an exhaust port 10 which is in communication with an exhaust passage 9 in an exhaust pipe 8.

At the upper portion of the exhaust port 10, there is formed a transversely extending recess 11 which is of a semicircular cross-sectional configuration. A rotary exhaust timing control valve 12 is disposed in the recess 11. The valve 12 is of a two-part construction having a central mating surface 13 located at the transverse center portion of the exhaust port 10. The valve 12 is of a part-circular cross-sectional configuration and has a cut-off surface 14 at one side so as to conform with the upper contour of the exhaust port 10. As shown in FIG. 1, the cut-off surface 14 has an edge adjacent to the combustion chamber 5 so that a rotation of the valve 12 causes a substantially vertical movement of the edge to change the heightwise position of the upper edge of the exhaust port. Thus, the rotation of the valve 12 results in a change in the exhaust port timing. The illustrated valve structure is similar to that disclosed in the above-mentioned United States patent application Ser. No.916,751 so that a reference may be made to the copending application for detail.

As shown in FIG. 2, the valve 12 is supported at each end by means of a valve holder 20 for rotation about its axis. One end of the valve 12 extends transversely outwardly beyond the valve holder 20 to provide an extension 12a which is connected with a lever bracket 21 and an actuating arm 22. The lever bracket 21 is fitted to the extension 12a of the valve 12 and secured thereto against relative rotation by means of a key 23. The actuating arm 22 is secured to the end face of the extension 12a by a bolt 24. The lever bracket 21 and the actuating arm 22 are connected together by a bolt 25. The lever bracket 21 has a free end which is spaced apart from the corresponding end of the arm 22 for receiving a rod end fitting 71 at the upper end of a push-rod 70. The fitting 71 is held between the lever bracket 21 and the actuating arm 22 and pivotably connected thereto by means of a pin 26. The above described mechanism at the end portion of the valve 12 is covered by a cap 27 which is secured to the cylinder 3 and has a cut-off 28 at the lower portion thereof for passing the push rod 70 therethrough.

The engine 1 includes a crankshaft 30 which has a crankweb 32 and connected with the piston 6 through a connecting rod 31. At one end of the crankshaft 30, there is a primary drive gear 33 which is splined to the crankshaft 30 and secured thereto by a spring washer 34 and a retaining nut 35. The drive gear 33 is formed at the outboard side with a counterbore for receiving an end of a coil spring 51. The drive gear 33 is in meshing engagement with a driven gear 37 as in a conventional arrangement.

At the axially outside portion of the crankshaft 30, there is provided a centrifugal governor assembly 40 which includes a governor shaft 41 having one end inserted into the end surface of the crankshaft 30 and secured thereto against rotation by a key 42. The other end or the outer end of the governor shaft 41 is supported for rotation through a bearing 44 by a outside cover 43 which is secured to the crankcase 4. At the outer end portion of the governor shaft 41, there is provided a rotating disc 45 which is of a substantially conical configuration and secured thereto to rotate as a unit. The rotating disc 45 is so arranged that the inner conical surface thereof is faced to the crankshaft 30. The rotating disc 45 is formed at the inner conical surface with a plurality of radially extending grooves 47 for receiving centrifugal balls 46.

On the governor shaft 41, there is mounted a sliding disc 48 which is adapted to be guided axially along the governor shaft 41 by the key 42. The sliding disc 48 has a conical portion 49 which is opposed to the conical inner surface of the rotating disc 45 to cooperate therewith. The balls 46 are disposed between the discs 45 and 48. The sliding disc 48 has a spring retainer 50 which receives the outer end of the spring 51 so that the disc 48 is forced toward the disc 45. The spring retainer 50 is positioned in opposite to the conical portion 49 of the sliding disc 48 with a pair of axially spaced thrust bearings 52 disposed therebetween.

The centrifugal governor assembly 40 is associated with a bell-crank lever mechanism 60 which includes a transversely extending shaft 61 supported above the thrust bearings 52 rotatably supported by an upper cover 62. The shaft 61 has a shift-fork 63 which is secured at the upper end to the shaft 61 by screws 64. The shift-fork 63 extends downwardly through an opening formed in the outside cover 43 and has a lower bifurcated end provided with pins 66 which is adapted to be fitted between the thrust bearings 52. Thus, an axial movement of the sliding disc 49 is converted into a swinging movement of the shift-fork 63 or a rotation of the shaft 61.

The shaft 61 has an end extending beyond the upper cover 62 and connected with the push rod 70 through a lever 67 and a rod end 72 provided at the lower end of the push rod 70. The rod ends 71 and 72 are attached to the push rod 70 through oppositely directed screw threads so that the effective length of the push rod 70 can be readily adjusted simply by rotating the push rod 70. For the purpose of securing the rod ends 71 and 72, there are respectively provided lock nuts 73 and 74. The push rod 70 extends vertically through cut-outs formed in the cooling fins of the cylinder 3 and a protective wall 75 is provided in the cylinder 3 to protect the push rod 70 and the mechanisms associated therewith from foreign materials.

In order to facilitate assembling of the centrifugal governor assembly 40, the outside cover 43 is formed with an opening which is adapted to be closed by a plug 80 and the governor shaft 41 is formed at the outer end with an internally threaded axial bore 81. With the plug 30 removed from the cover 43, an assembling tool may be threadably inserted into the governor shaft 41 and, with the aid of the assembling tool, the governor assembly 40 may be mounted in position.

In operation of the mechanism described above, the governor shaft 41 of the centrifugal governor assembly 40 is rotated by the engine crankshaft 30. The governor discs 45 and 48 are then rotated together with the centrifugal balls 46 so that the balls 46 are forced radially outwardly under the influence of the centrifugal force produced therein. The balls 46 are thus displaced radially outwardly along the grooves 47 in the disc 45 to thereby produce an axial movement of the sliding disc 48 against the influence of the spring 51. The axial movement of the sliding disc 48 is converted into a swinging movement of the fork 63 and therefore a rotation of the shaft 61. Thus, the push rod 70 is moved upwardly through the lever 67 to rotate the valve 12 clockwise in FIG. 1. The amount of the upward movement of the push rod 70 and therefore the angle of rotation of the valve 12 is dependent on the engine speed, the angle of rotation of the valve 12 being increased as the engine speed increases to advance the exhaust port timing.

In the illustrated embodiment, the inner conical surface of the rotating disc 45 is not a true conical configuration but of an arcuate form in a diametrical section. This configuration is recommendable from the viewpoint of manufacture since the grooves 47 can be formed simply by a rotary cutter having a radius equal to the radius of curvature of the arc of the grooves 47. The counterbore formed at the outer surface of the drive gear 33 is advantageous in that the axial dimension of the governor assembly 40 can in effect be decreased. In the illustrated embodiment, the lever mechanism 60 is provided for transmitting the axial displacement of the sliding disc of the governor assembly to the push rod 70 but the present invention is not necessarily limited to a use of such lever mechanism. Instead of the lever mechanism, there may be provided a suitable cam device. Further, the lever connection between the upper end of the push rod 70 and the valve 12 may be substituted by a suitable cam device.

The invention has thus been shown and described with reference to a specific embodiment, however, it should be noted that the invention is in no way limited to the details of the illustrated structures but changes and modifications may be made without departing from the scope of the appended claims.

I claim:

1. Two stroke engine comprising cylinder means, piston means which is received in said cylinder means for reciprocating movement, and crankshaft means connected with said piston means, said cylinder means having exhaust port timing control rotary valve means provided in said exhaust port means at the upper portion thereof, said valve means being rotatable on an axis parallel to the axis of rotation of the crankshaft means between a projected position wherein it is projected into the exhaust port means to thereby cover the upper portion of the exhaust port means and a retracted position wherein it is retracted from the exhaust port means, actuator means for moving said valve means between said projected and retracted positions in accordance with engine speed, said actuator means including driven shaft means extending parallelly with said crankshaft means, a centrifugal governor, said governor having a first disc secured to rotate with said driven shaft means and a second disc mounted to move along said driven shaft means, at least one ball mounted between the first and second discs, spring means urging the second disc toward the first disc and said at least one ball, a cross shaft mounted for rotation on an axis normal to said driven shaft means, a bell-crank lever, one end of said lever attached to the cross shaft along the axis of rotation of the cross shaft, the other end of the bell-crank lever engaging said second disc and tie rod means linking said cross shaft and said rotatable exhaust valve means so that said valve means is moved toward the projected position in response to a decrease in the engine speed.

2. The two stroke engine as defined in claim 1 further including a cover plate for said centrifugal governor, a threaded opening in said cover plate, a plug normally threaded in said threaded opening, a threaded axial bore in said driven shaft means concentric with the opening in the cover plate whereby with the plug removed from the cover plate a governor assembling tool may be threadedly mounted to said driven shaft.

3. The two stroke engine as defined in claim 2 further including a concentric bore in said crankshaft, one end of said driven shaft means keyed in said concentric crankshaft bore, a shaft support bearing for the other end of said driven shaft, and means mounting said shaft support bearing to said cover plate.

* * * * *